(12) United States Patent
Pozzi et al.

(10) Patent No.: US 7,434,766 B2
(45) Date of Patent: Oct. 14, 2008

(54) EMERGENCY OXYGEN OR OTHER GAS SUPPLY SYSTEM

(75) Inventors: Alexander N. Pozzi, Highland Village, TX (US); Scott F. Carbary, Snohomish, WA (US); Paul R. Bentley, Gainesville, TX (US); Marc Andre Coutu, Montreal (CA); Vincent Greter, Maurepas (FR)

(73) Assignees: Weber Aircraft LP, Gainsville, TX (US); Intertechnique (FR)

( * ) Notice: Subject to any disclaimer, the term of this patent is extended or adjusted under 35 U.S.C. 154(b) by 163 days.

(21) Appl. No.: 10/974,869

(22) Filed: Oct. 27, 2004

(65) Prior Publication Data

US 2005/0116101 A1  Jun. 2, 2005

Related U.S. Application Data

(60) Provisional application No. 60/518,499, filed on Nov. 7, 2003.

(51) Int. Cl.
*B64D 25/00* (2006.01)
(52) U.S. Cl. .................. 244/118.6; 244/118.5
(58) Field of Classification Search .............. 244/118.6, 244/118.5
See application file for complete search history.

(56) References Cited

U.S. PATENT DOCUMENTS

| | | | |
|---|---|---|---|
| 2,931,355 A | | 4/1960 | Miller et al. |
| 4,154,237 A | * | 5/1979 | Courter ................ 128/206.27 |
| 4,609,166 A | | 9/1986 | Brennan |
| 4,625,721 A | * | 12/1986 | Levine et al. .......... 128/201.28 |
| 5,154,374 A | | 10/1992 | Beroth |
| 5,795,018 A | | 8/1998 | Schumacher et al. |
| 5,984,415 A | | 11/1999 | Schumacher et al. |
| 6,227,489 B1 | * | 5/2001 | Kitamoto et al. ......... 244/118.5 |

FOREIGN PATENT DOCUMENTS

| | | |
|---|---|---|
| FR | 2 507 152 | 12/1982 |
| GB | 2111837 | 7/1981 |

* cited by examiner

*Primary Examiner*—Timothy D Collins
(74) *Attorney, Agent, or Firm*—Dean W. Russell; Kilpartick Stockton LLP

(57) ABSTRACT

Systems for supplying emergency oxygen or other gases to persons are addressed. The systems may include pod assemblies mounted on fixed-position masts between or adjacent passenger seats or pop-up modules installed within upper portions of seat backs. The pod assemblies and pop-up modules additionally may include other passenger-service equipment. Also optionally included in the systems are modular central gas supplies and alternative oxygen mask designs for passengers.

8 Claims, 3 Drawing Sheets

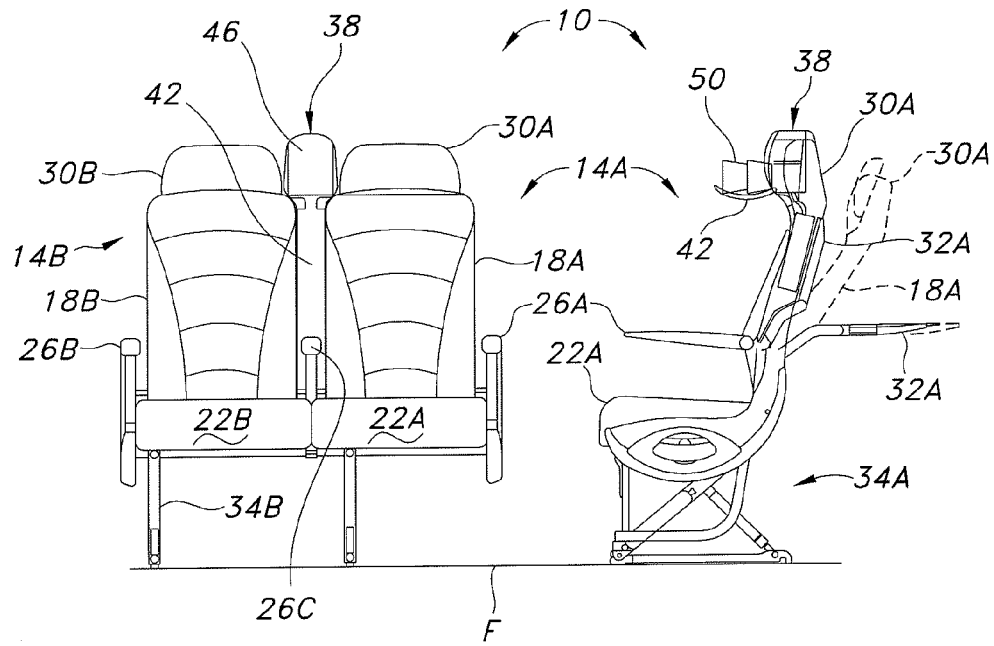
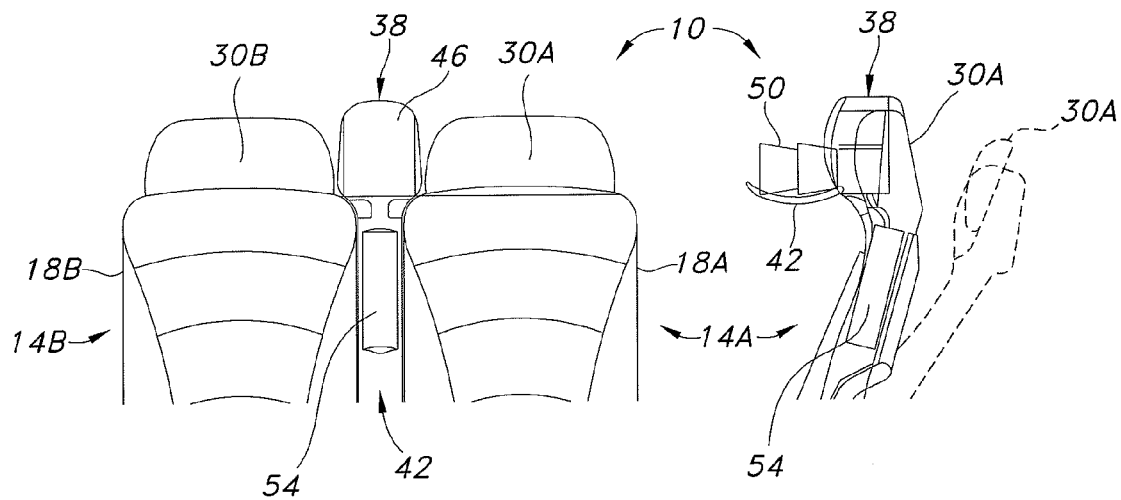
FIG. 1A  FIG. 1B
FIG. 2A  FIG. 2B

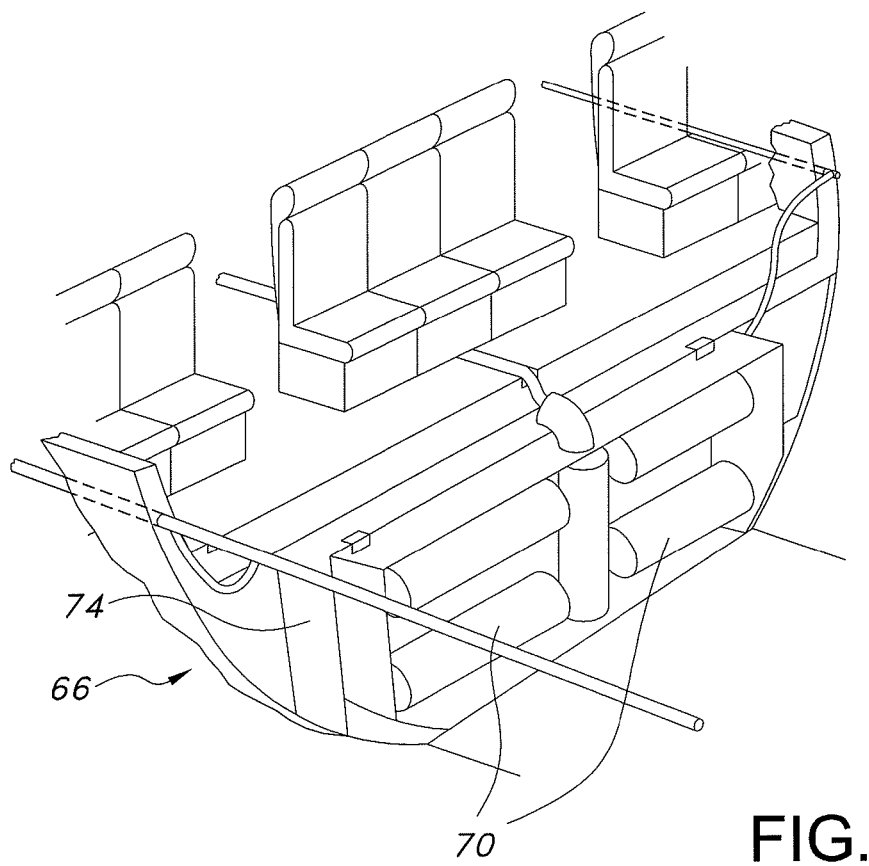
FIG. 5
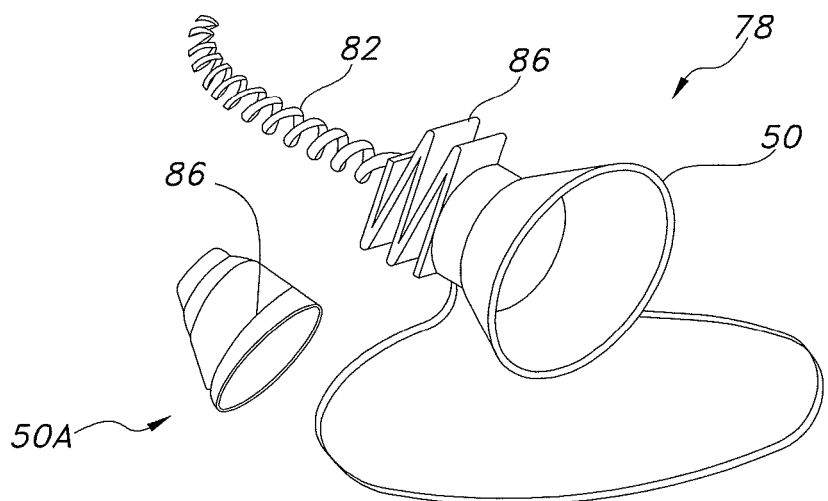
FIG. 7
FIG. 6

EMERGENCY OXYGEN OR OTHER GAS SUPPLY SYSTEM

CROSS-REFERENCE TO RELATED APPLICATION

This application claims the benefit of U.S. Provisional Application No. 60/518,499 filed on Nov. 7, 2003, the contents of which are incorporated herein by reference.

FIELD OF THE INVENTION

This invention relates to systems for supplying gases and more particularly, but not exclusively, to systems furnishing oxygen in emergencies to passengers onboard vehicles such as, but not limited to, commercial aircraft.

BACKGROUND OF THE INVENTION

U.S. Pat. Nos. 4,609,166 to Brennan and 5,154,374 to Beroth, incorporated herein in their entireties by this reference, disclose emergency oxygen-supply systems for aircraft. Included in the systems are oxygen-generating canisters located beneath seat cushions of commercial aircraft seats and oxygen masks positioned within the backs of the seats. Because the masks are positioned within seat backs, access to them is available only from the rears of the seats, so that the masks are intended for use only by passengers sitting in a row behind the seats in which the oxygen-generating canisters are located.

Detailed in U.S. Pat. No. 5,795,018 to Schumacher, et al. is an alternative oxygen-supply system for use in passenger cabins of aircraft. One version of the system includes a hollow, tubular bail associated with each passenger seat and at least partly framing its backrest. Incorporated in the bail is a head section containing, among other things, both an oxygen mask and an oxygen generator. Unlike the systems of the Brennan and Beroth patents, however, that of the Schumacher '018 patent is designed so that the oxygen mask resident in a particular head section is accessible to the passenger sitting in the associated seat.

U.S. Pat. No. 5,984,415 to Schumacher, et al. discusses cabin seats having passenger service units constructed as columns and arranged as "seat complementing components." According to the Schumacher '415 patent, such a component is defined to mean "a separate service component independent of the seat but fully capable of cooperating with the respective passenger seat for the passenger's comfort." See Schumacher '415, col. 2, 11. 55-58. Each component cooperates with a single seat to house, in a head section also functioning as a privacy shield, "essential passenger comfort and service elements such as a reading lamp, a loudspeaker or headphone jacks and an oxygen mask." See id., col. 4, 11. 39-41 (numerals omitted). An oxygen generator is disposed within a lower section of the component below an armrest.

Whereas some embodiments of the columnar components of the Schumacher '415 patent provide mask access to the passenger seated in the seat associated with the component, other versions provide oxygen masks to passengers seated in a row behind the associated seats. Yet other embodiments of the Schumacher '415 patent incorporate oxygen masks and generators within arm rests of passenger seats. The contents of the Shumacher patents are incorporated in their entireties herein as well by this reference.

Generally, however, emergency passenger oxygen systems are located in passenger service units placed in overhead modules of commercial aircraft. Because so positioned, the service units must be configured to conform to spacing (pitch) between seat rows and the number of seats in a row so that each passenger has ready access to an oxygen mask when deployed for emergency use. This required matching of service units and seating arrangements complicates the design of seating configurations within a vehicle and makes modification of existing designs time consuming.

Further, because the service units are placed in overhead modules, lower cabin ceilings inevitably result from their use. These lower ceilings impede passenger ingress to and egress from respective seats and reduce the amount of headroom and storage space available to transiting passengers. As a consequence, at least some aircraft builders believe customer satisfaction is impacted negatively when overhead passenger service units are used.

Aircraft builders also have expressed interest in thinner seat designs. They thus may be reluctant to deploy some of the systems described above, in which oxygen-related equipment is incorporated into a seat back. Placing the equipment in the seat back additionally may be problematic for structural certification reasons and because of potential accessibility problems depending on whether, and if so how, the seat is reclined.

SUMMARY OF THE INVENTION

The present invention provides, among other things, alternative pod assemblies associated with passenger seats. The assemblies, which need not bear one-to-one correspondence with seats, may include both oxygen-supplying and other equipment used or available for use by passengers. Non-limiting examples of such equipment include in-flight entertainment controls and equipment, telephones, seatbelt annuciators, reading lights, flight attendant call controls, and seat-movement controls. The assemblies additionally optionally may contain devices sensing whether a passenger is present or absent from a particular seat and, conceivably, means for communicating verbally with flight attendants, other cabin crew, or other passengers.

As, purportedly, with the components of the Schumacher '415 patent, the present pod assemblies avoid any need for locating any passenger service equipment overhead. However, unlike the components of the Schumacher '415 patent, the pod assemblies may be positioned between seats or otherwise not be connected to any seat backs. Accordingly, the pod assemblies need not necessarily move (and thus need not suffer move-related damage) when a seat back is reclined. Similarly, a single pod assembly positioned between two seats may provide passenger-service equipment for both adjacent seats.

Various embodiments of the pod assemblies are mounted on masts forming structural elements of sets of seats. Oxygen masks present in the pods may deploy via a hinged or other door or hatch therein. If desired, moreover, the pod assemblies may incorporate service doors to facilitate maintenance and replacement of equipment contained within. Pod assemblies additionally may function as head rests (particularly for sides of passenger heads), although preferably passengers will be unable to rest heads on any mask-deployment doors.

Pod assemblies with fixed positions also provide constant reference points for passengers. Stated differently, regardless of how a seat back is reclined, the oxygen mask for the corresponding occupant will deploy to the same location, allowing the occupant always to know where the mask will be when deployed. Similarly, mask deployment may always occur in view of the passenger, again regardless of how his or her seat is reclined.

Some versions of the invention incorporate oxygen-generating materials within the pod-mounting masts. In these configurations, conventional lanyard firing mechanisms may be used to commence oxygen generation. Those skilled in the art will, of course, recognize that other mechanisms may be employed instead.

Alternatively, oxygen generating apparatus may be centralized within the aircraft or other vehicle. If the apparatus is centralized, lengths of gas-supply tubing may be included within the masts to connect, directly or indirectly, individual oxygen masks to the central supply. Preferably, the tubing terminates at quick-connect fittings at the junction between a seat and the cabin floor, where they may be connected to the central supply. Yet alternatively, chemical or other oxygen generators may be deployed throughout the aircraft cabin rather than centralized. In some embodiments of the invention consistent with this approach, generators may be placed under seats, preferably adjacent the cabin floor, and connected to the tubing in the mast (or within or alongside seat frames) using the same quick-connect fittings (or otherwise). When the gas generators are remote from the masks, an electrical firing mechanism may be used to commence oxygen flow when a mask is activated by a passenger for use.

Discussed herein also are versions of the invention omitting some or all of the pod assemblies (or omitting some of their functionality) in favor of seat mounted oxygen-supply equipment. Unlike the systems of the Brennan and Beroth patents, in which oxygen masks deploy rearward from rears of seat backs, these embodiments utilize pop-up modules in the upper sections of the seats. When needed to be deployed, the masks become accessible through popping-up of the modules, after which they fall forward, toward the occupants of their corresponding seats. Hence, in these embodiments, a mask within a seat is presented to the seat occupant (as opposed to the occupant of a seat in a succeeding row) and deploys toward the occupant with assistance of gravity.

Additional aspects of the invention include innovative central gas-supply systems. Particularly useful for extended-range operations of twin-engine aircraft (ETOPS), these systems may be used to provide oxygen to passengers for extended periods of time (potentially sixty minutes or more). Included in the systems are multiple oxygen bottles placed in racks enclosed in dedicated compartments shaped to conform with cargo luggage compartment standards. Configuring the systems in this manner makes them modular and capable of being inserted into or removed from cargo bays rather than placed along the fuselage of an aircraft, as conventional oxygen-canister racks are. The modular compartments additionally may include connectors allowing rapid and easy connections to gas-transit tubing and electrical harnesses.

Finally, aspects of the present invention may include novel oxygen masks themselves. Because the pod assemblies and pop-up modules of the invention may provide limited space in which to house oxygen masks, the masks advantageously may be redesigned to reduce the space required for their storage. In some embodiments, the masks may have portions (particularly the cups) made of material with memory. Consequently, these masks may be compressed for storage but, when deployed, may return to their original forms. Alternative embodiments may provide cups (made of paper or other material) with a metal spring, spire, or other device designed to cause the cups to expand to appropriate shape upon deployment. Alternatively or additionally, either or both of the supply tubing or the bags associated with the masks may be made accordion-style so as to facilitate their storage in smaller volumes, and if optimized oxygen flow (RFCU) is physiologically possible, further reduction in bag size may result.

It thus is an optional, non-exclusive object of the present invention to provide systems for supplying emergency oxygen or other gases to passengers within a vehicle.

It is another optional, non-exclusive object of the invention to provide assemblies associated with passenger seats.

It is also an optional, non-exclusive object of the invention to provide such assemblies with pods in which passenger-service equipment such as, but not limited to, oxygen masks may be contained.

It is, moreover, an optional, non-exclusive object of the present invention to provide fixed-position masts on which pods may be mounted, so that passenger-service equipment may be equally available to passengers regardless of the orientation of their associated seats.

It further is an optional, non-exclusive object of the present invention to provide modular gas-supply systems for vehicles such as aircraft.

It is yet another optional, non-exclusive object of the present invention to provide gas-supply systems designed to conform with standard aircraft luggage compartments.

It is an additional optional, non-exclusive object of the present invention to provide alternative passenger oxygen masks reducing the amount of space required for their storage.

Other objects, features, and advantages of the present invention will be apparent to those skilled in the relevant art with reference to the remainder of the text and the drawings of this application.

BRIEF DESCRIPTION OF THE DRAWINGS

FIG. 1A is a front elevational view of exemplary seats illustrating aspects of the present invention.

FIG. 1B is a side elevational view of a seat of FIG. 1A illustrated in both an upright and, in phantom lines, a reclined position.

FIG. 2A is a front elevational view of portions of the seats of FIG. 1A.

FIG. 2B is a side elevational view of a seat portion of FIG. 2A illustrated in both an upright and, in phantom lines, a reclined position.

FIG. 5 is a perspective view of an exemplary modular central gas-supply system of the present invention.

FIG. 6 is a view of an exemplary emergency oxygen mask of the present invention.

FIG. 7 is a view of an alternative exemplary emergency oxygen mask of the present invention.

DETAILED DESCRIPTION

Figures 3A, 3B:
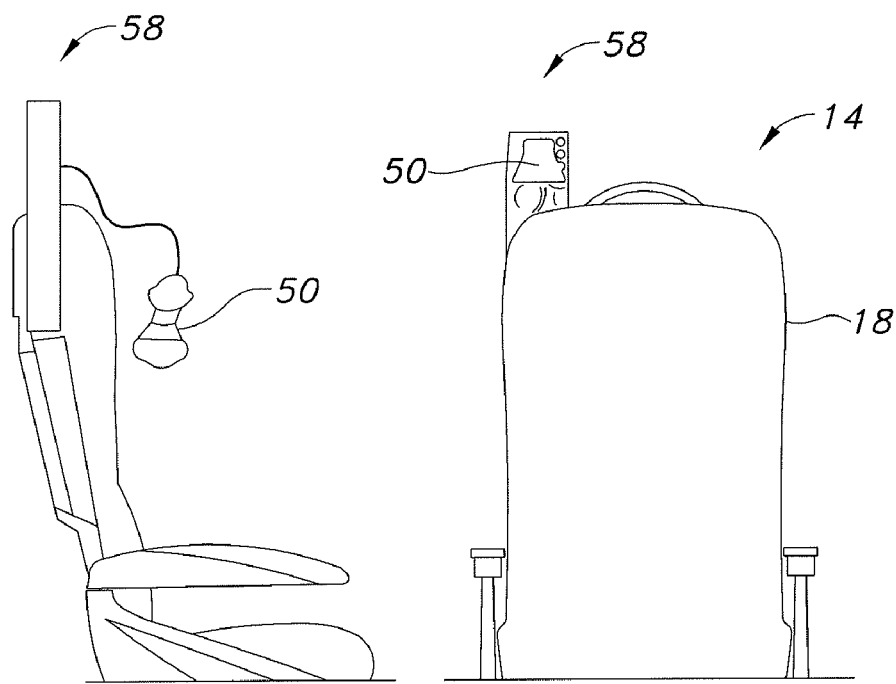
FIG. 3A is a front elevational view of a portion of an alternative seat illustrating aspects of the present invention.
FIG. 3B is a side elevational view of the portion of the seat of FIG. 3A.

Depicted in FIGS. 1A-B and 2A-B are portions of seat cluster 10 consistent with aspects of the present invention. As shown in these figures, cluster 10 comprises seats 14 (denoted 14A and 14B), each designed for a single human occupant. However, those skilled in the relevant field understand that cluster 10 may contain fewer or more seats 14 than the two illustrated in FIGS. 1-2.

Each of seats 14A and 14B may include components common to seats presently in use in vehicles (particularly commercial aircraft). Referring to seat 14A, for example, it may include seat back 18A, seat bottom 22A, and optionally at least one arm rest 26A. Also detailed in FIGS. 1-2 for seat 14A are head rest 30A, (rearwardly-extending) tray table 32A, and leg assembly 34A designed for attachment to floor F of an aircraft or other cabin. Similarly, seat 14B may include some or all of seat back 18B, seat bottom 22B, arm rest 26B, head rest 30B, a tray table (not shown), and leg assembly 34B (only portions of which are shown). Moreover, if cluster 10 comprises more than one seat 14, then some optional components such as (but not limited to) arm rest 26C may be shared among seats 14.

FIGS. 1-2 additionally depict pod assembly 38 and mast 42, aspects of the present invention. Mast 42 is shown positioned between seats 14A and 14B; in this configuration, it may if desired be considered to be common, or shared, by the seats 14A-B. Although mast 42 may be connected to either or both of seat backs 18A and 18B, it preferably is connected to neither, so that its position remains fixed regardless of whether seat backs 18A and 18B are reclined or upright (see, e.g., FIGS. 1B and 2B). Likewise, mast 42 may be connected to other portions of seats 14A and 14B or, alternatively, connected directly to floor F.

Mounted or otherwise attached to mast 42 is pod assembly 38. Pod assembly 38 may include door 46, typically (although not necessarily) hinged to facilitate its remaining open when appropriate. Incorporated into pod assembly 38 may be various passenger-service equipment including (but not necessarily limited to) one or more emergency oxygen masks 50. When emergency oxygen is required for the occupants of seats 14A and 14B, for example, door 46 opens—preferably automatically—and (at least) two such masks 50 are deployed. Alternatively, pod assembly 38 may contain two doors 46, one for each occupant of seats 14A and 14B, with at least one mask 50 positioned behind each door 46. Preferably, any doors 46 open to the front of the plane of upright seat backs 18A and 18B, so that masks 50 are immediately accessible to the occupants of seats 14A and 14B. In this configuration, a service door or hatch conceivably could be provided in the rear of pod assembly 38. (If, however, pod assembly 38 is intended to provide masks 50 to occupants of seats behind seats 14A and 14B, any doors 46 advantageously may open to the rear of mast 42 and any service door present may open to the front or side of mast 42.)

In a version of mast 42 illustrated in FIGS. 2A-B, one or more chemical oxygen generators 54 may be incorporated within the mast 42. So doing reduces the amount of tubing needed to provide fluid connection between a generator 54 and corresponding masks 50. Positioning generator 54 within mast 42 additionally reduces the possibility of a passenger inadvertently contacting the generator 54 and either being burned by heat generated by it or impeding its operation.

FIGS. 3A-3B show module 58 installed in an upper section of seat back 18 of seat 14. Module 58 may be used as an alternative to pod assembly 38 to supply an oxygen mask 50 to the occupant of seat 14. When emergency oxygen is required, module 58 is designed to pop-up from within seat back 18, releasing a mask 50 to the occupant of the seat 14. Module 58 may include a door if desired, although no such door is necessary because of the (hidden) positioning of module 58 prior to use. As depicted in FIG. 3B, mask 50 is designed to release forward of the plane of seat back 18 so as to be available to the occupant of seat 14. Again, however, by reversing the release design, mask 50 could if desired be made available instead to an occupant of a seat behind seat 14.

Figure 4:
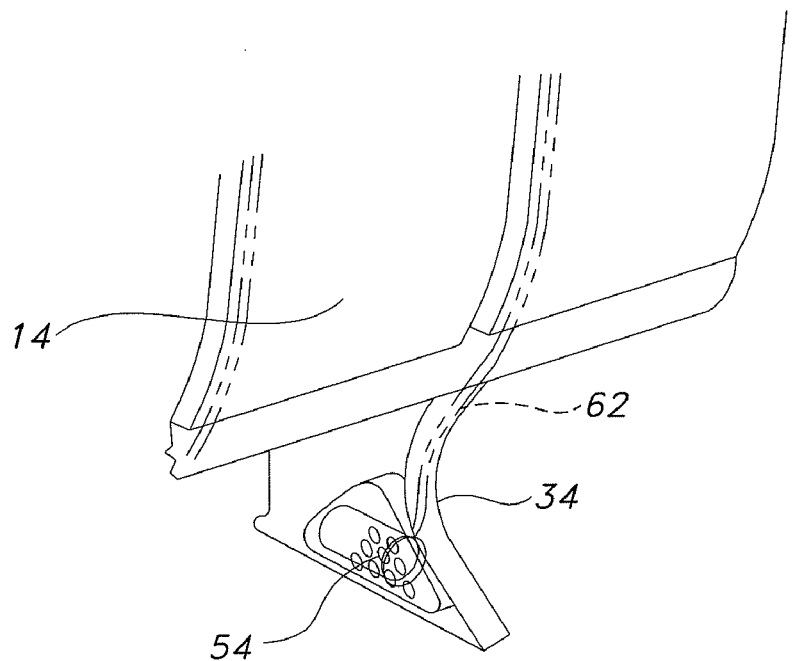
FIG. 4 is a perspective view of part of another exemplary seat of the present invention.

FIG. 4 details an alternative position for oxygen generator 54. As shown in FIG. 4, generator 54 may be incorporated into leg assembly 34, with tubing 62 connecting generator 54 to masks 50 either via mast 42 (if present) or along or within a frame of seat 14. This positioning of generator 54 is particular useful if (1) pop-up module 58 is utilized and (2) seat-by-seat oxygen generation is desired. It may, however, necessitate use of some sort of heat shield to avoid, or reduce risk of, heat-related injuries to passengers.

Illustrated somewhat conceptually in FIG. 5 is modular central gas-supply equipment 66. Conventionally, oxygen bottles and associated equipment are installed in racks and held with multiple brackets alongside the fuselage of an aircraft. In this configuration additional design activity may be required to insulate and ventilate the racks satisfactorily. By contrast, cylinder racks 70 of equipment 66 may be enclosed in a compartment 74 shaped to (LD3) luggage compartment standards. Racks 70 additionally may integrate required distribution equipment (electrical flow control units and under-floor distribution conduits, for example). Thus, if a maker or operator of a particular aircraft desires centralized oxygen supply, equipment 66 may readily be installed within a cargo compartment. If central oxygen supply is unnecessary, equipment 66 either simply may not be installed, may be removed (if already installed), or may be disconnected from supply lines but not removed (if already installed).

FIG. 6 depicts possible modifications to mask assembly 78, which includes mask 50, to facilitate its storage in lesser space than is conventionally used. Fluid supply tubing 82 could, for example, have an accordion design (like many conventional telephone cords) so as to require decreased (linear) storage space. Bag 86 likewise could have an accordion, or pleated, design for the same reason. Alternatively or additionally, mask 50 could be modified to produce mask 50A shown in FIG. 7, in which a wire or other spire 86 (or equivalent spring-like structure) is utilized to bias mask 50A into its fully-extended position (illustrated in FIG. 7) for use. When stowed, by contrast, mask 50A may be compressed merely by overcoming the bias of spire 86.

The foregoing is provided for purposes of illustrating, explaining, and describing exemplary embodiments and certain benefits of the present invention. Modifications and adaptations to the illustrated and described embodiments will be apparent to those skilled in the relevant art and may be made without departing from the scope or spirit of the invention.

What is claimed is:

1. A vehicle seat assembly for a vehicle having a floor, the vehicle seat assembly comprising:
    a. a first seat comprising a first seat back;
    b. a second seat adjacent the first seat, the second seat comprising a second seat back;
    c. a container between the first and second seat backs and connected to at least one of the first seat, the second seat, or the floor; and
    d. means, comprising a plurality of oxygen masks positioned partially or completely within the container, for supplying emergency oxygen to occupants of the first and second seats.

2. A vehicle seat assembly according to claim 1 in which the container comprises a pod.

3. A vehicle seat assembly according to claim 1 in which each of the first and second seats has a reclinable back and the container remains fixed in place when the reclinable back of either the first or second seat is reclined.

4. A vehicle seat assembly according to claim 1 in which the vehicle is an aircraft.

5. A vehicle seat assembly according to claim 1 in which the container comprises a mast connected to at least one of the first or second seats.

6. A vehicle seat assembly according to claim 3 in which the container comprises a mast connected to at least one of the first or second seats.

7. A vehicle seat assembly according to claim 5 in which at least the first seat further comprises a seat bottom and the mast extends upward from the seat bottom.

8. A vehicle seat assembly according to claim 6 in which at least the first seat further comprises a seat bottom and the mast extends upward from the seat bottom.

* * * * *